3,028,419
PREPARATION OF UNSATURATED ALDEHYDES

Herman S. Bloch, Skokie, Ill., assignor to Universal Oil Products Company, Des Plaines, Ill., a corporation of Delaware
No Drawing. Filed Apr. 13, 1959, Ser. No. 805,725
11 Claims. (Cl. 260—491)

This invention relates to a process for the preparation of unsaturated aldehydes. More particularly it relates to the reaction of an olefinic organic compound with carbon monoxide in the presence of a catalyst to yield an unsaturated aldehyde composed of one more carbon atom than the olefinic organic compound from which it was derived.

Various methods are currently employed in the preparation of the highly useful unsaturated aldehydes. The oxidation of unsaturated primary alcohols, the conversion of glycols, and the condensation of aldehydes are among the more predominant. The general utility of the unsaturated aldehydes, as evidenced by the extensive and varied fields of application, which include plasticizers, insecticides, solvents, flavors, spices, perfumes, tanning agents, chemical intermediates, as well as many others, is conducive to novel methods of preparation which tend to substantially reduce the costs of production.

The addition of carbon monoxide to a suitable olefinic organic compound appears to be the shortest route to the desired unsaturated aldehydes. The utilization of a single step reaction minimizes the possibility of undesirable side reactions and results in an increased yield of the desired products.

It is therefore the object of this invention to prepare unsaturated aldehydes by means of a single step reaction, the reactants being carbon monoxide and a suitable olefinic organic compound. It is a further object to utilize a catalytically active material which will enable the reaction to proceed under milder conditions than previously employed.

In one embodiment this invention relates to a process for the carbonylation of an olefinic organic compound which comprises forming a mixture consisting essentially of said olefinic organic compound and carbon monoxide, and reacting said mixture in the presence of a catalyst comprising a solid adsorbent material impregnated with a metal of the iron group of the periodic table and a halide selected from the group consisting of a boron halide and a hydrogen halide, and recovering the resulting carbonylated olefinic organic compound.

Another embodiment resides in a process for the carbonylation of an olefinic organic compound which comprises forming a mixture consisting essentially of said olefinic organic compound and carbon monoxide, and reacting said mixture in the presence of a catalyst comprising an activated alumina impregnated with cobalt and boron trifluoride, at a reaction temperature of from about 25° C. to about 200° C., and at a pressure of from about 25 atmospheres to about 750 atmospheres, and recovering the resulting carbonylated olefinic organic compound.

A more specific embodiment relates to a process for the carbonylation of ethylene which comprises forming a mixture consisting essentially of ethylene and carbon monoxide, and reacting said mixture in the presence of a catalyst comprising gamma alumina impregnated with cobalt and boron trifluoride at a reaction temperature of from about 50° C. to about 170° C., and at a pressure of from about 50 atmospheres to about 400 atmospheres, and recovering the resulting acrolein.

Pursuant to the objectives of this invention as set forth above, an olefinic organic compound is reacted with carbon monoxide in the presence of a solid catalyst in the manner hereinafter described in the following detailed specifications.

The term "olefinic organic compound" is intended to include olefinic hydrocarbons. Suitable olefinic hydrocarbons are such as ethene, propene, 2-methylpropene, 1-butene, 2-butene, 1,3-butadiene, 2-methyl-1-butene,3-methyl-1-butene, 2-methyl-2-butene, 2-methyl-1,3-butadiene, 2,3-dimethyl-1,3-butadiene, 1-pentene, 2-pentene, 1,3-pentadiene, 2-methyl-1-pentene, 3-methyl-1-pentene, 4-methyl-1-pentene, etc., as well as their higher homologues. Cyclopentene, cyclopentadiene, cyclohexene, 1,3-cyclohexadiene, 1,4-cyclohexadiene, 1-vinyl-2-cyclohexene, 1-vinyl-3-cyclohexene, etc., are representative of cycloolefins which may be utilized as olefinic organic hydrocarbons.

Organic compounds in general, which contain a carbon to carbon double bond within their molecular structure fall within the broad scope of this invention. For example, vinyl acetate, allyl acetate, crotonyl acetate, ethyl acrylate, methyl acrylate, ethyl crotonate, etc., are suitable as well as 3-butenenitrile, 4-pentenenitrile, 2-hexenenitrile, 2-heptenenitrile, etc., and others such as vinyl ether, vinyl methyl ether, vinyl ethyl ether, allyl ether, allyl ethyl ether, etc., in addition to higher homologues.

This process employs a catalyst which comprises a solid adsorbent material containing metal of the iron group of the periodic table and a halide selected from a group consisting of a boron halide and a hydrogen halide.

Suitable solid absorbent materials are such as activated carbon, fuller's earth, activated clays, bone char, activated aluminas, activated silicas, etc., with the activated aluminas, and particularly gamma and theta aluminas, being preferred.

The selected solid absorbent is impregnated with a metal of the iron group of the periodic table. The impregnation is accomplished by the utilization of a suitable salt of a metal of said iron group. Included in this group are salts of iron, nickel, and cobalt. Nickel chloride, nickel bromide, nickel iodide, nickel fluoride, nickel nitrate, nickel sulfate, nickel acetate, nickel formate, etc., ferric chloride, ferric bromide, ferric fluoride, ferric nitrate, ferric sulfate, ferric formate, ferric acetate, etc., cobalt nitrate, cobalt sulfate, cobalt chloride, cobalt bromide, cobalt fluoride, cobalt iodide, cobalt acetate, cobalt formate, etc., are exemplary of salts utilizable for this process, the cobalt salts being preferred.

The catalyst is further impregnated with a halide of hydrogen or boron as an active component. The preferred impregnation is with boron trifluoride. Boron tribromide, boron trichloride, etc., as well as hydrogen fluoride, hydrogen bromide, hydrogen chloride, etc., can be used, although the use of any other particular halide does not necessarily result in a catalyst with equivalent catalytic properties.

Preparation of the catalyst can proceed by any conventional or convenient method. One such method utilized is that by which a salt of a metal of the iron group of the periodic table is made into a water solution the quantity of metal salt dissolved being such as to insure a metal deposit of from about 5% to about 28% and preferably from about 10% to about 20% by weight of the preferred catalyst support. The selected adsorbent material is treated with water sufficient to form an aqueous slurry and the previously prepared aqueous solution of a salt of a metal of the iron group of the periodic table is added thereto. The composite thus formed is dried at a temperature in the range of from about 100° C. to about 200° C., after which the catalyst may be formed into pills or other suitable shapes by any conventional method. The catalyst is treated with a halide of boron or of hydrogen such that the catalyst has a halide content of from about 2% to about 20% by weight, and preferably of from about 6% to about 12%. Said halide treatment may take place in a closed vessel under super-atomspheric pressure or by exposure to a gas stream composed of a selected halide. The catalyst is then calcined at a temperature in the range of from about 300° C. to about 650° C. The order of impregnation of the solid adsorbent material may be reversed, or the impregnations can be performed simultaneously.

A preferred catalyst then consists of an activated alumina impregnated with about 10% to about 20% by weight of cobalt and with boron trifluoride sufficient to provide a fluoride content of from about 6% to about 12% by weight.

When it is desirable to extend the operation of this process beyond the normal life of the catalyst, a boron or hydrogen halide is supplied to the system to be adsorbed on the solid adsorbent catalyst support, thus replacing such halide as may have been washed away during extended operations.

The process is pressure dependent, resulting in the absorption of carbon monoxide. Accordingly, a superatmospheric pressure in the range of from about 24 atmospheres to about 750 atmospheres, and preferably in the range of from about 50 atmospheres to about 400 atmospheres is utilized.

Stoichiometrically, the reaction of olefinic organic compounds with carbon monoxide to yield carbonylated organic compounds requires a ratio of 1 mol of olefinic organic compound to 1 mol of carbon monoxide. However, it is preferable to operate with an excess of carbon monoxide as a deterrent to undesirable side reactions such as polymerization of the olefinic reactant. Accordingly, a mol ratio of carbon monoxide to olefinic organic compound of about 1:1 to about 5:1 or more is preferred.

The reaction to which this process applies may be effected at a temperature in the range of from about 25° C. to about 200° C. However, a preferred range is from about 50° C. to about 170° C. although this may vary depending upon the olefinic organic compound utilized as a reactant.

When the process of this invention is carried out in a batchwise manner as hereinafter described, a residence time in the range of from about 1 hour to about 10 hours is suitable while a residence time of from about 2 hours to about 6 hours is preferred. In a continuous flow operation a residence time which is compatible with the economic aspects of the present process is readily determined through routine operational tests by anyone skilled in the art.

This process is operable under batch type or continuous flow conditions. In a batch type process, a high pressure reaction vessel designed for the introduction of gaseous reactants and suitably equipped with heating and agitating devices can be employed. An autoclave is an example of such apparatus as above described. The catalyst is placed within the reaction chamber of the autoclave and the chamber is flushed one or more times with carbon monoxide. The reactants are then pressured into the autoclave and heated, with agitation, to a predetermined temperature. On completion of the proper residence time the autoclave is cooled to about room temperature and the pressure released. The autoclave is flushed with an insert gas such as nitrogen. The product is decanted from the catalyst and further treated to obtain the desired degree of purity.

In a continuous flow type of process the reactants are continually introduced by a compressor to a high pressure reaction chamber, suitably equipped with proper heating means. The reactants may be commingled or they may be introduced in individual streams. The reactants are preheated before introduction to the fixed catalyst bed located within the high pressure reactor. The reactor effluent is passed to a high pressure separator suitably cooled to insure separation of gaseous and liquid phases. The gaseous phase is recycled to the reaction zone while the liquid phase is metered through a pressure reducing valve and passed to a fractionating column for further separation and recovery of the desired product.

The following examples are given by way of illustration and are not intended to unduly limit the generally broad scope of this invention.

*Example I*

5 g. of a prepared catalyst comprising gamma alumina impregnated with about 15% by weight of cobalt and about 10% by weight of boron trifluoride is placed in a glass liner and inserted in a 1 liter autoclave. The autoclave is flushed several times with carbon monoxide, and then pressured with about 600 p.s.i. of carbon monoxide followed by about 500 p.s.i. of ethylene. The temperature is brought to 150° C. and the autoclave agitated at this temperature for a period of approximately four hours after which time the pressure drop appears to be complete. The autoclave is cooled to room temperature and the excess pressure released. The liquid product is decanted from the catalyst and 40 g. of acrolein recovered therefrom.

*Example II*

5 g. of a prepared catalyst comprising gamma alumina impregnated with about 15% by weight of cobalt and about 10% by weight of boron trifluoride is placed in a glass liner and inserted in a one liter autoclave. The autoclave is flushed several times with carbon monoxide and then pressured with about 600 p.s.i. of carbon monoxide followed by about 500 p.s.i. of propene. The temperature is raised to approximately 150° C. and the autoclave is agitated at this temperature until the pressure drop is complete which is approximately four hours. The autoclave is allowed to cool to room temperature and depressured. 65 g. of crotonaldehyde is recovered from the liquid product decanted from the catalyst.

*Example III*

5 g. of a prepared catalyst comprising gamma alumina impregnated with about 15% by weight of cobalt and about 10% by weight of boron trifluoride is placed in a glass liner and inserted in a one liter autoclave. The autoclave is flushed several times with carbon monoxide and about 110 g. of vinylcyclohexene is added thereto. 1000 p.s.i. of carbon monoxide is pressured into the autoclave and the temperature brought to about 165° C. The autoclave is agitated at this temperature for a period of about four hours. There is a notable pressure drop during this period. The autoclave is then cooled to room temperature, the pressure released, and the liquid product decanted from the catalyst. 64 g. of 3-(cyclohexenyl)-2-propenal is recovered from the liquid product.

*Example IV*

7 g. of catalyst consisting of gamma alumina impregnated with about 15% by weight of cobalt and about 10% by weight of boron trifluoride is placed in a glass liner and inserted in a one liter autoclave. The autoclave is flushed with carbon monoxide and then charged with about 100 p.s.i. of carbon monoxide. 100 g. of allyl acetate is added by means of a compressor and the total pressure is then brought to approximately 1000 p.s.i. with carbon monoxide. The temperature is then raised to and maintained at about 160° C. for approximately four hours after which the pressure drop appears to be complete. The autoclave is cooled to room temperature and the pressure released. The liquid product is decanted from the catalyst and 63 g. of 4-acetoxycrotonaldehyde recovered.

*Example V*

5 g. of a prepared catalyst comprising gamma alumina impregnated with about 15% by weight of cobalt and about 10% by weight of boron trifluoride is placed in a glass liner and inserted in a one liter autoclave. The autoclave is flushed several times with carbon monoxide and then charged with 100 p.s.i. of carbon monoxide. About 104 g. of styrene is added by means of a compressor and the total pressure is then brought to approximately 1000 p.s.i. with carbon monoxide. The temperature is then raised to and maintained at about 165° C. for approximately four hours after which time the pressure drop appears to be complete. The autoclave is cooled to room temperature and depressured. The liquid product is decanted from the catalyst and 42 g. of cinnamaldehyde and some polymer is recovered therefrom.

I claim as my invention:

1. A process for the carbonylation of an olefinic hydrocarbon which comprises forming a mixture consisting essentially of said olefinic hydrocarbon and carbon monoxide in a mol ratio of carbon monoxide to olefinic hydrocarbon of about 1:1 to about 5:1, and reacting said mixture in the presence of a catalyst comprising a solid adsorbent material impregnated with cobalt and boron trifluoride, at a reaction temperature in the range of from about 25° C. to about 200° C., and at a pressure of from about 25 atmospheres to about 750 atmospheres, and recovering an olefinically unsaturated aldehyde having one more carbon atom than said olefinic hydrocarbon.

2. A process for the carbonylation of an aliphatic olefinic hydrocarbon which comprises forming a mixture consisting essentially of said aliphatic olefinic hydrocarbon and carbon monoxide in a mol ratio of carbon monoxide to olefinic hydrocarbon of about 1:1 to about 5:1, and reacting said mixture in the presence of a catalyst comprising a solid adsorbent material impregnated with cobalt and boron trifluoride at a reaction temperature in the range of from about 25° C. to about 200° C., and a pressure of from about 25 atmospheres to about 750 atmospheres, and recovering an olefinically unsaturated aldehyde having one more carbon atom than said aliphatic olefinic hydrocarbon.

3. A process for the carbonylation of an olefinic hydrocarbon which comprises forming a mixture consisting essentially of said olefinic hydrocarbon and carbon monoxide in a mol ratio of carbon monoxide to olefinic hydrocarbon of about 1:1 to about 5:1, and reacting said mixture in the presence of a catalyst comprising an activated alumina impregnated with cobalt and boron trifluoride at a reaction temperature of from about 25° C. to about 200° C., and at a pressure of from about 25 atmospheres to about 750 atmospheres, and recovering an olefinically unsaturated aldehyde having one more carbon atom than said olefinic hydrocarbon.

4. A process for the carbonylation of an aliphatic olefinic hydrocarbon which comprises forming a mixture consisting essentially of said aliphatic olefinic hydrocarbon and carbon monoxide in a mol ratio of carbon monoxide to olefinic hydrocarbon of about 1:1 to about 5:1, and reacting said mixture in the presence of a catalyst comprising an activated alumina impregnated with cobalt and boron trifluoride, at a reaction temperature of from about 25° C. to about 200° C., and at a pressure of from about 25 atmospheres to about 750 atmospheres, and recovering an olefinically unsaturated aldehyde having one more carbon atom than said aliphatic olefinic hydrocarbon.

5. A process for the carbonylation of an olefinic hydrocarbon which comprises forming a mixture consisting essentially of said olefinic hydrocarbon and carbon monoxide in a mole ratio of carbon monoxide to olefinic hydrocarbon of about 1:1 to about 5:1, and reacting said mixture in the presence of a catalyst comprising gamma alumina impregnated with cobalt and boron trifluoride, at a reaction temperature in the range of from about 50° C. to about 170° C., and at a pressure of from about 50 atmospheres to about 400 atmospheres, and recovering an olefinically unsaturated aldehyde having one more carbon atom than said olefinic hydrocarbon.

6. A process for the carbonylation of an aliphatic olefinic hydrocarbon which comprises forming a mixture consisting essentially of said aliphatic olefinic hydrocarbon and carbon monoxide in a mol ratio of carbon monoxide to olefinic hydrocarbon of about 1:1 to about 5:1, and reacting said mixture in the presence of a catalyst comprising gamma alumina impregnated with cobalt and boron trifluoride at a reaction temperature of from about 50° C. to about 170° C., and at a pressure of from about 50 atmospheres to about 400 atmospheres, and recovering an olefinically unsaturated aldehyde having one more carbon atom than said aliphatic olefinic hydrocarbon.

7. A process for the carbonylation of ethylene which comprises forming a mixture consisting essentially of ethylene and carbon monoxide in a mol ratio of carbon monoxide to ethylene of from about 1:1 to about 5:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting acrolein.

8. A process for the carbonylation of propylene which comprises forming a mixture consisting essentially of propylene and carbon monoxide in a mol ratio of carbon monoxide to propylene of from about 1:1 to about 5:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting crotonaldehyde.

9. A process for the carbonylation of styrene which comprises forming a mixture consisting essentially of styrene and carbon monoxide in a mol ratio of carbon monoxide to styrene of from about 1:1 to about 5:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting cinnamaldehyde.

10. A process for the carbonylation of 1-vinyl-3-cyclohexene which comprises forming a mixture consisting essentially of vinylcyclohexene and carbon monoxide in a mol ratio of carbon monoxide to vinylcyclohexene of from about 1:1 to about 5:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting 3-(cyclohexenyl)-2-propenal.

11. A process for the carbonylation of allyl acetate which comprises forming a mixture consisting essentially of allyl acetate and carbon monoxide in a mol ratio of carbon monoxide to allyl acetate of from about 1:1 to about 5:1, and reacting said mixture in the presence of a catalyst comprising gamma alumina impregnated with cobalt and boron trifluoride, at a reaction temperature of from about 50° C. to about 170° C., and at a pressure of from about 50 atmospheres to about 400 atmospheres, and recovering the resulting 4-acetoxycrotonaldehyde.

References Cited in the file of this patent

Gerrard et al.: Chem. Rev. 58, 1081–1082 (1958).